Sept. 19, 1961 D. O. MARTIN ET AL 3,000,121
AUTOMATIC VERTICAL CONTROL OF EARTH MOVING MACHINES
Filed May 21, 1956 2 Sheets-Sheet 1
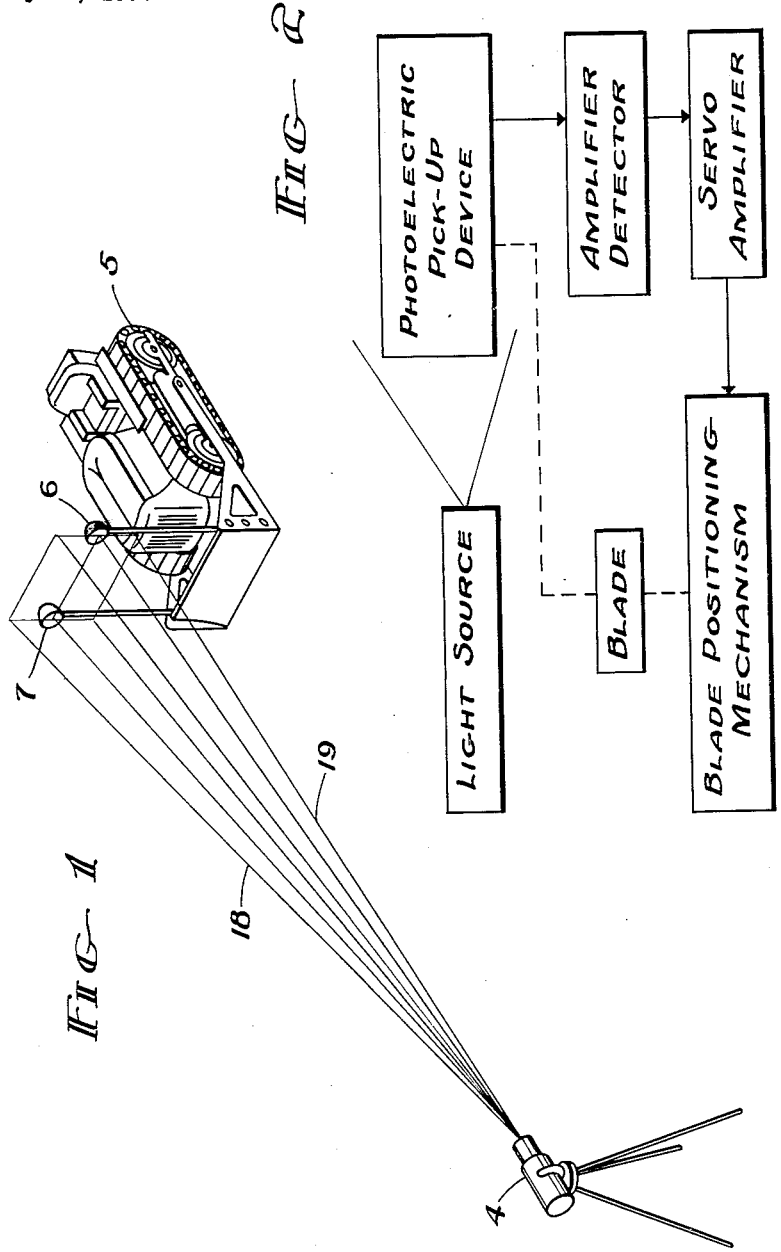
INVENTORS
DAVID O. MARTIN
FRANK J. OCNASCHEK
BY
ATTORNEYS

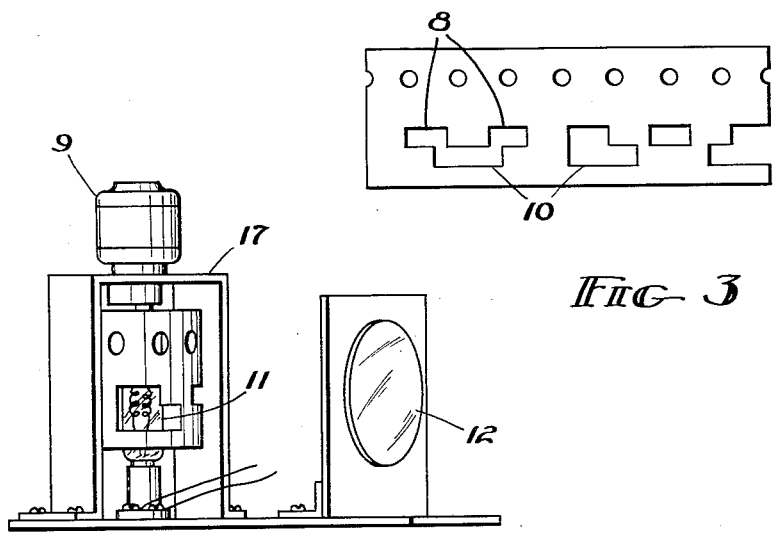
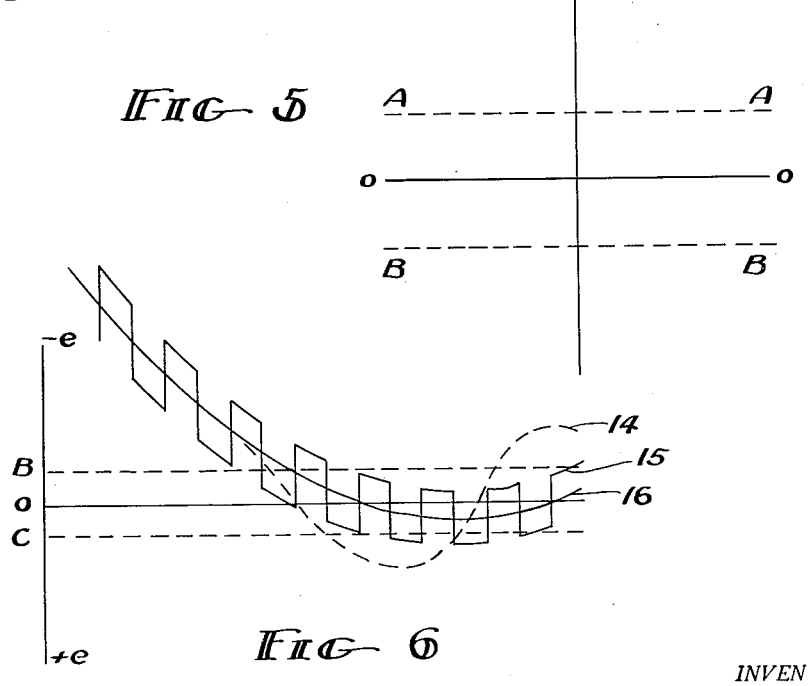

¹
3,000,121
AUTOMATIC VERTICAL CONTROL OF EARTH
MOVING MACHINES
David O. Martin, Dallas, and Frank J. Ocnaschek,
Richardson, Tex., assignors to Collins Radio Company,
Cedar Rapids, Iowa, a corporation of Iowa
Filed May 21, 1956, Ser. No. 586,197
3 Claims. (Cl. 37—144)

This invention relates to automatic control of earth-moving machines and more particularly to the automatic control of the vertical motion of the blade or similar element of earth-moving machines.

With the great road-building projects now being planned and with the large amount of road-building now being performed, automatic control of the large earth-moving machines would greatly lower the cost of these roads. Additionally, the automatic control of these earth-moving machines would measurably increase the speed with which the roads could be built. There is at present no adequate vertical control for the blades of earth-moving machines whereby a modern roadbed can be automatically prepared to requisite specifications. There are indeed some old mechanical devices which, if properly constructed at great expense, would maintain a scraper blade at some prescribed level. However, these prior-art devices are not capable of giving the tolerances and speed required in present-day road-making. There is no operable system today to automatically control large earth-moving machines. Road construction companies are presently finding that the cost of making concrete roads is very closely related to the accuracy of the grade obtained. If the grade has been cut too deep, a greater quantity of concrete is required to meet the finished grade and costs go up. If the grade has not been cut deep enough, the contractor does not meet the specifications as to thickness of concrete and reimbursement for the work is not commensurate with the expense.

Thus, it is seen some accurate means of controlling large earth-moving machines is desirable, especially in road-construction projects. The vertical control of the elements of these large earth-moving machines will be very valuable in road construction and accurate vertical control will aid the road construction industry immeasurably. It is a feature of this invention that the vertical control of large earth-moving machines may be controlled with great accuracy. It is a further feature of this invention that the cutting elements of large earth-moving machines are accurately controlled in their vertical operation by frequency-sensitive devices. It is another feature of this invention that the vertical movements of the cutting elements of earth-moving machines are controlled with a frequency-sensitive device operating in the visual frequency range.

It is an object of this invention to provide a vertical control device for the cutting elements of earth-moving machines which is simple to construct and economical to operate. It is another object of this invention to provide an accurate control system for earth-moving machines which poses relatively few reflection and interference problems.

It is a still further object of this invention to provide a vertical control system for earth-moving machines which operates by differentiating between two frequencies which have been imposed upon a light switch.

It is yet another object of this invention to provide a completely automatic device for the vertical control of the blade or similar element of earth-moving machines whereby the blade is controlled in its vertical movement to plus-or-minus one-half inch.

This invention will be better understood when the following description is read in conjunction with the accompanying drawings, in which—

FIGURE 1 is a perspective view showing the general relationship between the control unit and the earth-moving machine;

FIGURE 2 is a block diagram of the control system of this invention;

FIGURE 3 is an expanded view of the frequency generator of this invention;

FIGURE 4 is a representation of the frequency generator and the light source;

FIGURE 5 is a graphical representation of the solenoid operation versus blade displacement of this invention, and FIGURE 6 is a graphical representation showing the effect of dither voltage upon the response of the system of this invention.

Referring now to FIGURE 1, the source of light 11 and the frequency-generating device 17 are located in a transit-type instrument 4. This frequency-generating device and light source project to beams or planes of light 18 and 19, one beam being modulated by the frequency-generating device at one frequency and the second beam being modulated by the frequency-generating device at another frequency. In one embodiment of this invention, the first beam was modulated at a frequency of 150 cycles per second and the second beam was modulated at a frequency of 90 cycles per second. These are the frequencies which will be generated by the frequency-generating device as shown in FIGURES 3 and 4. The line of demarcation between these two modulated light beams is very sharp and differentiation based upon the frequency imposed upon the light beam may be very accurate.

On the earth-moving machine 5, which is shown as a tractor of the crawler type, but which may be any earth-moving machine possessing any number of desired characteristics, are located two photo-electric cells 6 and 7. The photo-electric cells 6 and 7 may be General Electric type PJ23's, for example. These photo-electric cells are used in many applications, as for example, in movie projectors. As shown in FIGURE 1, these cells are located on raised projections from the blade of the tractor and are further located near the extremities of the blade. Vertical control of the blade may thus be applied to either of the photo-electric cells and consequently both extremities of the blade are subject to vertical control. If less accuracy is desired, it would be possible to place a single photo-electric cell in the center of the blade of the earth-moving machine.

The photo-electric cells 6 and 7 act as pick-up devices and are shown as such in the block diagram in FIGURE 2. The output from the photo-electric cells is fed to an amplifier-detector. The output from the photo-electric cells 6 and 7 will be proportional to the amount of 90-cycle or 150-cycle signal intercepted by the respective cells. Thus, if the blade of the earth-moving machine is below the desired level, a greater amount of 90-cycle signal will be fed to the amplifier-detector from both photo-electric pick-up devices. The amplifier-detector may consist of any of the well-known forms of amplifier-detector and in the specific embodiment consists of a 90-cycle bandpass filter and a bridge rectifier and a 150-cycle bandpass filter and a separate bridge rectifier. The inputs to these bandpass filters are in parallel. The outputs from the 90-and 150-cycle rectifiers are connected in series opposition so as to generate a direct current output signal which is proportional to the amplitude difference between the 90-and 150-cycle input signals. The error signals generated are proportional to the difference in signal strength between the 90-and 150-cycle input signals and are proportional to the error in the displacement of the blade from the desired vertical position. The amplifier-detectors used in this invention are well known in aircraft control systems, and may be a type such as illustrated in Moseley Patents 2,423,336 and 2,423,337.

As shown in FIGURE 2, the output from the amplifier-detector, which is the error signal, is fed to a servo-amplifier. This servo-amplifier may be any of the well-known types and must sufficiently amplify the signal to control the blade-positioning mechanism. The servo-amplifier may be of the type described in the Moseley Patent 2,423,336. A servo-amplifier is merely an amplifying device which receives a signal and amplifies it to a level sufficient to operate follow-up apparatus.

The error is proportional to the relationship of each individual pick-up device to the line of demarcation between the 90-and 150-cycle signals. Thus, each individual end of the blade may be adjusted with respect to the line of demarcation. It is apparent that if a single photoelectric cell were placed in the center of the blade, accuracy would be reduced since the center of the blade would be the only location responsive to the generated signals.

Modulation of the light source is accomplished by a rotating slotted drum such as is shown in FIGURE 3. The slots 8, which are spaced in this specific embodiment 72 degrees apart, produce a frequency of 150 cycles per second with the drum rotated by the motor 9 at 1800 revolutions per minute. The slots 10 are equally spaced 120 degrees apart on the surface of the drum and produce a frequency of 90 cycles per second modulated on the light source with the same speed of rotation of the drum. The light source 11 is stationary and of sufficient power to project a light beam over a given distance, the given distance being the distance over which it is desired to automatically control the earth-moving machine. The only power source required for the operation of this automatic control system external to the power of the earth-moving machine is that required for the light source 11 and motor 9. A lens 12 may be mounted forward of the light source and the rotating drum to provide amplification of the light source and the frequencies modulated thereon to extend the operation range of the automatic control of this invention.

The operation of this automatic control device is dependent upon proper mechanical construction of the cutting element of the earth-moving machine that is, the mechanical elements of the tractor or earth-moving machine must be made so as to be responsive to the control device. The detection system of this invention must be able to produce a response in the positioning of the blade as directed by the control signal. FIGURE 5 is a graphical representation of the operation of the blade-positioning mechanism with respect to the blade error signal. The blade positioning mechanism in one embodiment includes solenoids which operate upon an error signal voltage to move the blade in a vertical direction. The control system including the blade positioning mechanism is such that hydraulic controls may operate in response to the signals applied to the solenoids to move the blade. It has been common to control the cutting blade of a tractor by hydraulic valves which may be controlled manually by an operator. At times solenoid valves have been used to control the blade.

The present invention connects the output of the servo-amplifier to blade-positioning solenoid valves such that the position of the blade may be adjusted until the photoelectric pickup device produces a balanced output. When this condition exists the blade is positioned with reference to the beam of light in the desired manner. The up mechanism is operated when the error-signal voltage is greater than the line A—A and the down mechanism is operated when the error-signal voltage is greater than the line B—B. A voltage proportional to the blade displacement below the reference line is shown above the center line and a voltage proportional to the blade displacement above the reference line is shown below the center line. No operation of the solenoid occurs when the error-signal voltage is between the lines A—A and B—B, there being insufficient error-signal voltage to operate the mechanism between these points. However, with this minimal error area, the mechanism will tend to be sluggish in correcting. To reduce this sluggishness and reduce the blade speed when applying a small error signal to the mechanism, a dither voltage is applied. This dither voltage produces a slow positioning action on small signal voltages while allowing the full speed and power of the blade to be developed under large error-signal voltages.

FIGURE 6 shows the dither voltage applied to the error voltage and the resulting error voltage. The error voltage of the system which would be developed without the dither voltage is depicted by dotted line 14. The dither voltage is a square-wave voltage impressed upon the error voltage and is depicted as the square wave 15. The operation of the solenoids is dependent upon the resulting error voltage which is the resultant of the addition of the voltage 14 and the voltage 15. This resultant voltage is shown as a solid line 16 in FIGURE 6. As is apparent from FIGURE 6, the modulations of the error-signal voltage without the application of dither voltage are damped by the dither voltage and the solenoids tend to be operated with less signal and less overshooting. In FIGURE 6, the solenoids are operated when the error voltage exceeds the dotted lines B and C with the up solenoid being operated in the area above the dotted line B and the down solenoid operated when the signal is in the area below the dotted line C.

Although this invention has been described with respect to a particular embodiment thereof, it is not to be so limited as changes and modifications may be made therein which are within the full intended scope of the invention as described by the appended claims.

What is claimed is:

1. Means for controlling a movable blade of an earth-moving machine comprising a photo-electric pickup device mounted on the blade of said tractor, a transmitting means comprising a light source, a rotating drum surrounding said light source and formed with at least two circumferentially arranged rows of slots, each of said rows of slots having a different number of slots therein, each row of slots constructed and arranged to modulate said light beam, a motor driving said rotating drum, said light source in conjunction with the rotating drum establishing a plane of reference defined by the comparative intensities of the modulated light beams, said photo-electric pickup device constructed to receive said light beams, an amplifier-detector attached to said photo-electric pickup device and producing an output which is zero when the photo-electric pickup device is in alignment with the plane of reference and producing a direct current signal with a polarity which indicates whether the photo-electric pickup device is above or below the plane of reference, a servo-amplifier receiving the direct current signal from said amplifier-detector, and a blade positioning mechanism receiving the output of said servo-amplifier and positioning said blade so as to close the servo loop to maintain the output of the amplifier-detector at zero.

2. Means for controlling a movable blade of an earth-moving machine comprising a pair of photo-electric pick-up devices mounted on opposite ends of the blade of said tractor, a transmitting means comprising a light source, a rotating drum surrounding said light source and formed with at least two circumferentially arranged rows of slots, each row of slots having a different number of slots therein, each row of slots being constructed and arranged to modulate said light beam a motor driving said rotating drum, said light source in conjunction with the rotating drum establishing a plane of reference defined by the comparative intensities of the modulated light beams, said photo-electric pickup devices constructed to receive said light beams, an amplifier-detector attached to said photo-electric pickup devices and producing an output which is zero when the photo-electric pickup devices are in alignment with the plane of reference and producing a direct current signal with a polarity which indicates whether the photo-electric pickup devices are above or below the plane of reference, a servo amplifier receiving the direct current signal from said amplifier-detector, and a blade positioning mechanism receiving the output of said servo amplifier and positioning said blade so as to close the servo loop to maintain the output of the amplifier-detector at zero.

3. Means for controlling a movable blade of an earth-moving machine comprising a photo-electric pickup device mounted on the blade of said tractor, a transmitting means comprising a light source, a rotating drum surrounding said light source and said rotating drum having slots formed therein adjacent each other such that a first group of slots when rotated by the motor produces a modulation on the light beam of a first frequency $f_1$ and a second group of slots producing a second frequency $f_2$ different from $f_1$, a motor driving said rotating drum, said light source in conjunction with the rotating drum establishing a plane of reference, said photo-electric pickup device receiving energy from said light source, an amplifier-detector attached to said photo-electric pickup device is in alignment with the plane of reference and producing a direct current signal with a polarity which indicates whether the photo-electric pickup device is above or below the plane of reference, a servo amplifier receiving the direct current signal from said amplifier-detector, and a blade positioning mechanism receiving the output of said servo amplifier and positioning said blade so as to close the servo loop to maintain the output of the amplifier-detector at zero.

References Cited in the file of this patent

UNITED STATES PATENTS

| | | |
|---|---|---|
| 1,370,688 | Hammond | Mar. 8, 1921 |
| 1,486,886 | Hammond | Mar. 18, 1924 |
| 1,996,233 | Daviah | Apr. 2, 1935 |
| 2,043,413 | Knox et al. | June 9, 1936 |
| 2,370,000 | Best | Feb. 20, 1945 |
| 2,425,541 | Konet | Aug. 12, 1947 |
| 2,458,334 | Brosius | Jan. 4, 1949 |
| 2,494,069 | Steffen | Jan. 10, 1950 |
| 2,796,685 | Bensinger | June 25, 1957 |
| 2,817,764 | Jacobs | Dec. 24, 1957 |
| 2,916,836 | Stewart | Dec. 15, 1959 |

UNITED STATES PATENT OFFICE
CERTIFICATE OF CORRECTION

Patent No. 3,000,121

September 19, 1961

David O. Martin et al.

It is hereby certified that error appears in the above numbered patent requiring correction and that the said Letters Patent should read as corrected below.

Column 6, line 1, after "device" insert -- and producing an output which is zero when the photoelectric pickup device --.

Signed and sealed this 24th day of April 1962.

(SEAL)
Attest:

ESTON G. JOHNSON
Attesting Officer

DAVID L. LADD
Commissioner f Patents